(12) United States Patent
Torsner et al.

(10) Patent No.: US 8,243,666 B2
(45) Date of Patent: Aug. 14, 2012

(54) METHOD AND UNIT FOR EFFICIENT REPORTING OF SCHEDULING INFORMATION IN A WIRELESS TELECOMMUNICATIONS SYSTEM

(75) Inventors: Per Johan Torsner, Masaby (FI); Mats Fredrik Sågfors, Kyrkslätt (FI); Stefan Henrik Andreas Wager, Espoo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 442 days.

(21) Appl. No.: 12/306,071

(22) PCT Filed: Nov. 22, 2006

(86) PCT No.: PCT/EP2006/011187
§ 371 (c)(1),
(2), (4) Date: Aug. 7, 2009

(87) PCT Pub. No.: WO2007/147431
PCT Pub. Date: Dec. 27, 2007

(65) Prior Publication Data
US 2010/0008307 A1  Jan. 14, 2010

(30) Foreign Application Priority Data
Jun. 21, 2006  (SE) ........................ 0601381

(51) Int. Cl.
*H04W 4/00* (2009.01)
*H04B 1/00* (2006.01)
(52) U.S. Cl. ................. 370/329; 455/69; 370/348

(58) Field of Classification Search .............. 370/322, 370/341, 348, 349, 395.4; 455/69, 70, 422.1, 455/509, 525
See application file for complete search history.

(56) References Cited

U.S. PATENT DOCUMENTS

| | | | |
|---|---|---|---|
| 2004/0224677 A1* | 11/2004 | Kuchibhotla et al. | 455/422.1 |
| 2005/0259662 A1* | 11/2005 | Kim et al. | 370/395.4 |
| 2005/0265301 A1* | 12/2005 | Heo et al. | 370/349 |
| 2006/0246847 A1* | 11/2006 | Kim et al. | 455/69 |
| 2007/0010281 A1* | 1/2007 | Sebire | 455/525 |
| 2007/0014274 A1* | 1/2007 | Choi | 370/349 |
| 2009/0257378 A1* | 10/2009 | Cuny et al. | 370/328 |
| 2010/0067477 A1* | 3/2010 | Chun et al. | 370/329 |

FOREIGN PATENT DOCUMENTS
EP  1 599 063 A  11/2005

OTHER PUBLICATIONS

3rd Generation Partnership Project. "Buffer Reporting for E-UTRAN." 3GPP TSG-RAN WG2 Meeting #52, R2-060829, Athens, Greece, Mar. 27-31, 2006.*

* cited by examiner

*Primary Examiner* — Chi Pham
*Assistant Examiner* — Awet Haile

(57) ABSTRACT

The present invention relates to a method and arrangement in a wireless communication system for efficient reporting of scheduling information processed in a unit of said system. The method comprises the steps of adaptively selecting a buffer status report format that is most efficient for the momentary buffer content for indicating the buffer fill levels of the scheduler, and encoding said buffer fill levels such as to minimize the number of bits needed to encode the information.

14 Claims, 3 Drawing Sheets

| UPH (5bits) | TEBS (5bits) | HLBS (4bits) | HLID (4bits) |
|---|---|---|---|

| UPH (5bits) | TEBS (5bits) | HLBS (4bits) | HLID (4bits) |
|---|---|---|---|

Fig. 1

| Buffer Format Indicator Field | Buffer Report Field |
|---|---|

| RB id | Buffer fill level |
|---|---|

| B1 | B2 | B3 | B4 | Btot |
|---|---|---|---|---|

METHOD AND UNIT FOR EFFICIENT REPORTING OF SCHEDULING INFORMATION IN A WIRELESS TELECOMMUNICATIONS SYSTEM

TECHNICAL FIELD

The present invention relates to methods and arrangements in a telecommunication system, in particular to an efficient buffer status encoding.

BACKGROUND

In the study item UTRAN long term evolution (LTE) initiated by the 3rd Generation Partnership program (3GPP) it has been decided that a scheduling mechanism similar to the one used in Enhanced D-Channel Handler (E-DCH) shall be adopted for LTE. The scheduler in a Node B schedules resources in both downlink and uplink. In the uplink, the scheduler needs information about the data that is available in the buffers of the user equipments (UE). This is achieved by transmitting scheduling information messages from the user equipment to the Node B. The scheduling information is transmitted as part of the Medium Access Layer Protocol (MAC) and can therefore be either piggybacked with other transmissions (when those are ongoing) or be sent stand alone by creating MAC PDUs just to transfer the scheduling information. The scheduling information in E-DCH has the format depicted in FIG. 1. HLID denotes the Highest priority Logical channel ID; TEBS denotes the Total E-DCH Buffer Status; HLBS denotes the Highest priority Logical channel Buffer Status (which is a value that is coded relative to TEBS, i.e. a percent of indicated TEBS value); and UPH denotes the UE Power Headroom (which field relates to the power used in the UE). When the scheduling information is received in the Node B, the scheduler can determine the logical channel that has the highest priority (HLID), how much data that is stored in the UE buffer for this logical channel (HLBS), and the total UE buffer size (TEBS). In total this information is encoded in 13 bits.

In a long-term evolution (LTE-) system there is a desire to employ a finer granularity on the QoS than is possible in E-DCH. The E-DCH solution has some limitations. If the user equipment has data on several logical channels (radio bearers) it is only possible to see the amount of data on the channel with the highest priority. It is, however, not possible to know if the remaining data has rather high, low, or very low priority. It is neither possible to know how the data is distributed between these priorities. This means that it is difficult to achieve service differentiation for any other service than the one with highest priority.

A prior-art solution to this problem is to signal the buffer status per radio bearer (or per priority/Qos class). In order to achieve a reasonable low size of the buffer status message the number of bits for the buffer size of each radio bearer (or priority/QoS class) needs to be rather low, e.g. 2 bits per buffer as will be used in the following. This solution, however, implies the disadvantage that it provides a very poor granularity when in comes to the total buffer size of the user equipment. When assuming, for example, that there is only data available for one radio bearer the total UE buffer is then encoded with only 2 bits, which is not sufficient. Clearly the number of bits per buffer can be increased but that leads to a large buffer status message. One conceivable option could be to encode the total buffer size separately. In that way relatively few bits could be used to encode the buffer size for each radio bearer (e.g. 2 bits) and an additional N bits could be used to encode the total buffer size. This would result in both a rough view of the buffer size per radio bearer as well as a reasonable accurate indication of the total buffer size. However, this would also lead to a large total buffer status message.

Other reasons of having a finer granularity than in the E-DCH scheduling solution, include among others:
1). Starvation between QoS levels within a single UE: Low priority data flows may be starved by higher priority traffic
2) Inability for the operator to control cell capacity partitioning between QoS classes: Scheduler can in E-DCH not know which radio bearers that have data (except for the highest priority radio bearer which is indicated explicitly)
3) Low-priority traffic hitching a free ride: Low priority data may get a free ride when high priority data is scheduled if the scheduler is not aware how much data that is available on different radio bearers EP 1 599 063 relates to an apparatus and method for performing scheduling in a Node B for data transmission of a user equipment UE in a mobile communication system supporting an enhanced uplink dedicated channel (E-DCH). The Node B receives, from a radio network controller (RNC), scheduling assistance information for an uplink service to be provided from the UE. The Node B estimates a data amount for the uplink service on the basis of the scheduling assistance information in each scheduling period. The Node B schedules data transmission for the uplink service according to the estimated data amount. As recognized by the examiner D1 sends different transmitting format reports.

U.S. 2004/0224677 relates to a method for using buffer occupancy in uplink scheduling for a communication device includes a first step of sending buffer occupancy information and a time stamp indicating a last transmission opportunity provided to the communication device to an active set base stations. A step of utilizing the buffer occupancy information and time stamp to adjust a scheduling fairness setting for the communication device. A step of receiving scheduling information from a scheduler in accordance with the scheduling fairness setting, and a next step includes transmitting on an uplink channel in accordance with the scheduling information.

SUMMARY OF THE INVENTION

It is an object of the present invention to provide a method and arrangement for achieving an efficient encoding of the scheduling information (buffer status information) in a wireless system such as, e.g., a LTE-system or a High Speed Packet Access (HSPA) evolution system, to provide—with as few bits as possible—a sufficient indication of the amount of available data on different radio bearers and a fine granularity on the total UE buffer size.

It is thus an advantage of the present invention that it allows for an efficient way to report buffer fill levels in a wireless system, which results, compared to state-of-the-art solutions, in more information to the scheduler and allowing for service differentiation while not increasing the overhead of the status reports.

Other objects, advantages and novel features of the invention will become apparent from the following detailed description of the invention when considered in conjunction with the accompanying drawings and claims.

BRIEF DESCRIPTION OF THE DRAWINGS

FIG. 1 illustrates the E-DCH scheduling information format.

FIG. 3 illustrates a buffer format indicator according to the present invention.

FIG. 4 illustrates the format for data on a single radio bearer.

FIG. 5 illustrates the format for data on many radio bearers.

DETAILED DESCRIPTION

The present invention provides an adaptive buffer status format where the user equipment autonomously, or by help of appropriate criteria, selects the format that is most efficient for the momentary buffer content. The encoding of the buffer fill levels for the case of several radio bearers uses the information from the buffers on the individual radio bearers in order to reduce the number of bits needed to encode the information of the total UE buffer size.

Figure 2:
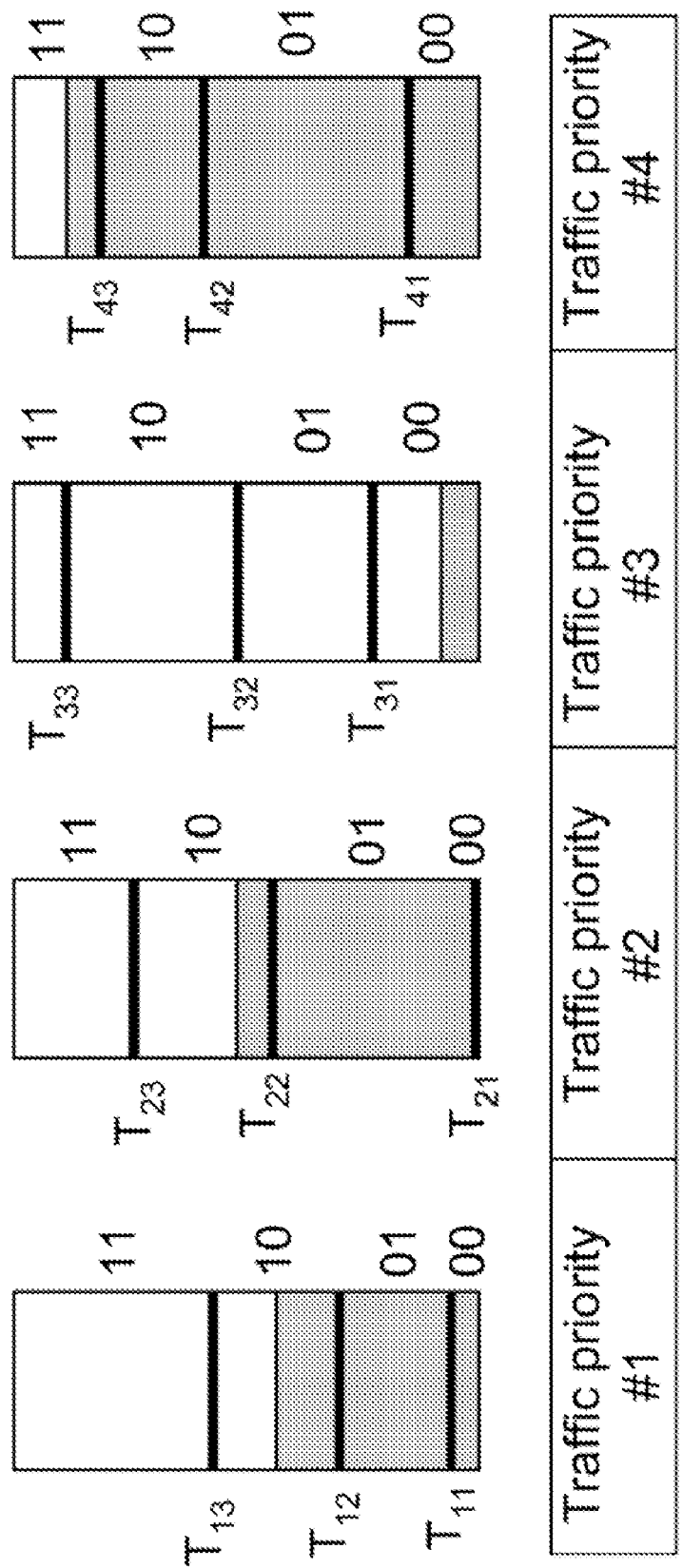
FIG. 2 illustrates the problem of the prior-art solution.
Figure 6:
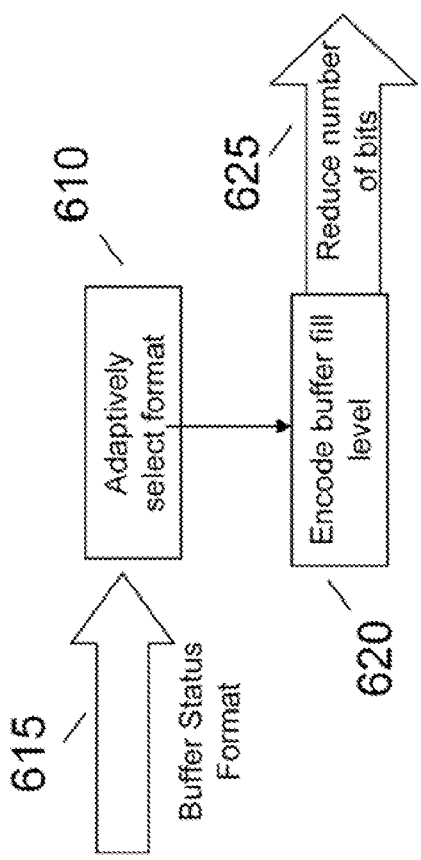
FIG. 6 illustrates a block diagram of a method according to the invention.

Generally, the invention relates to a method in a wireless communication system for efficient reporting of scheduling information processed in a unit of said system, as illustrated in FIG. 6. The method comprises the steps of: adaptively selecting (610) a buffer status format 615 for indicating the buffer fill levels of the scheduler; and encoding (620) the buffer fill levels. The encoding step is to reduce 625 the number of bits needed to encode the information of the total buffer size.

A first embodiment of the present invention relates to an adaptive buffer status report format. The format of the buffer status report that is efficient to use depends on the momentary buffer fill levels on the individual radio bearers as well as on how many radio bearers are configured, which services are ongoing, etc. The user equipment should therefore be allowed to select (e.g. autonomously) the format of the buffer status report to minimize the number of bits needed (or maximize the information that can be extracted with a fixed number of bits). The basic structure of the buffer status report is depicted in FIG. 3. The buffer format indicator field 31 (e.g. of length 1 or 2 bits) is used to indicate the format that the rest of the buffer report field 32 is encoded with.

Below follow a few examples of buffer report formats. In these examples the total number of bits has been chosen as 12 but only in order to illustrate the possible relations of the field sizes in the various formats. In practice the different formats can, however, have different lengths since the receiver of the buffer status report can deduce the length of the format from the buffer format indicator.

In case data is available on only one radio bearer it is efficient to indicate the radio bearer id (RBid) in a field 41, for instance of length 3 bits, and the buffer fill level in a field 42 of a length of, e.g., 9 bits. This is shown in FIG. 4. It is expected to be a common case that data is only available on a single radio bearer. This format provides a very high granularity of the total buffer size in that common case.

In order to provide service differentiation, it is necessary to report information about the amount of data for different radio bearers, or groups of radio bearers, per QoS class, per traffic priority or a similar criterion. In the following the expression radio bearers is used for reasons of simplicity. In the example depicted in FIG. 5, four radio bearers are configured. The buffer fill level B, denoted Bk, for each configured radio bearer k is encoded into N bit fields 51, 52, 53, 54. Each of the $2^N$ possible values for Bk is mapped to a buffer fill level interval such that, e.g., Bk=01 means a buffer fill level between 100 and 500 bytes. The mapping between Bk and the buffer fill level interval is most likely hard coded in the specifications but can also be configurable by higher layer signaling.

When encoding the total UE buffer B, denoted Btot, into the field 55, the information extracted from the fields B1 . . . B4 is used to improve the granularity of the information in the following way: A sufficient estimation of the total UE buffer fill level can be obtained by summarizing the values B1 . . . B4 such that B_estimated=B1+B2+B3+B4. The error in this estimation Err=B−B_estimated is encoded into the field Btot. Since the value range of Err is much smaller than the value range of B the granularity of Btot can be made better with this method. It can be seen that this format gives a rough indication about the buffer fill level on individual radio bearers as well as a medium granularity of the total UE buffer fill level.

An alternative coding for the case of several radio bearers is to first encode the total size of the UE buffer in one field, Btot, and then encode the buffer fill levels for each individual radio bearer Bk as a fraction of the value indicated in Btot. The advantage compared to letting Bk and Btot indicate an absolute buffer fill level is that the value range of Btot is smaller than the value range of the possible buffer fill level.

There are several alternatives for a user equipment to select a buffer status format. It is one possibility that the format can be configured via higher layer signaling protocol (e.g. the RRC) such that a user equipment always uses the same format. This format can then be reconfigured, e.g., depending on the number of services that are configured. According to another possibility the user equipment can autonomously select which format to use. This selection can depend, e.g., on the buffer fill levels of the individual radio bearers. For instance, if data is only available on one radio bearer a certain format is selected while otherwise, i.e. for several radio bearers, another format is selected. Finally, the user equipment can alternate between the formats. This could achieve both a high granularity of the total buffer fill level as well as information about the data on individual radio bearers.

Following example gives five configured radio bearers: RRC signaling, SIP, VoIP, Video, Best effort (BE) internet access. In this example a multimedia telephony service is configured with the service components SIP signaling, VOIP and Video. In addition an RRC signaling radio bearer is configured and a best effort bearer used for internet access. An example of a mapping between QoS indicator and priority order is shown in the table below (in practice the priority order would be a list of radio bearer IDs). The mapping between QoS indicator and priority order would be configured in the UE via RRC signaling.

TABLE 1

| QoS indicator | Priority order |
| --- | --- |
| 1 | RRC, SIP, VoIP, Video, BE |
| 2 | RRC, BE, SIP, VoIP, Video |
| 3 | RRC, VoIP, Video, SIP, BE |
| 4 | RRC, Video, VoIP, SIP |

In the typical case the scheduler would use QoS indicator 1 which indicates that radio bearers should be scheduled in the default order of priority. In case starving occurs for e.g. the BE internet access bearer this would be detected by the Node B scheduler and scheduling would be performed with QoS indicator 2 for a while, which would give a higher priority to the BE. In a similar manner, QoS indicators 3 or 4 would be used if the radio bearers carrying VOIP or Video needs more resources than their default priority allows. In the last row the BE internet bearer is not even included, which implies that data from this radio bearer is not allowed to be transmitted. As can be seen the RRC signalling always have the highest priority in the example. That is a likely implementation choice but nothing prevents RRC to be down prioritized as well.

Figure 7:
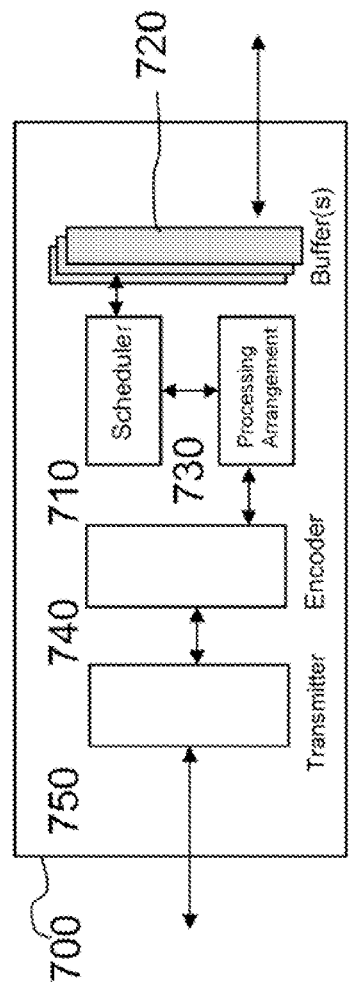
FIG. 7 block diagram of an arrangement according to the invention.

FIG. 7 illustrates an exemplary unit 700 according to the present invention, for example in a UE, comprising a scheduler 710 for scheduling information processed in one or more buffers 720. The unit further comprises a processing arrangement 730 for adaptively selecting a buffer status format for indicating the fill levels of the scheduler buffers and an encoder 740 for encoding the buffer fill levels such as to reduce the number of bits needed to encode the information of the total buffer size. The unit further comprises a transmitter 750 for transmitting an information element including the buffer status report to other network units. The unit is described very briefly including the functional units essential for carrying out the invention.

The invention claimed is:

1. A method in a wireless communication system for efficient reporting of scheduling information processed in a user equipment of said system, comprising:
adaptively selecting, from among at least a first format and a second format, a buffer status format for indicating buffer fill levels of the user equipment based on a number of radio bearers or groups of radio bearers, k, for which data is available for transmission, wherein the first format indicates a buffer fill level associated with a single radio bearer or group of radio bearers and the second format indicates buffer fill levels associated with a plurality of different radio bearers or said groups of radio bearers; and
encoding buffer fill levels, $B_k$, for each radio bearer or said group of radio bearers k into N bit fields, wherein each of the $2^N$ possible values for $B_k$ is mapped to a buffer fill level interval.

2. The method according to claim 1, whereby the encoded buffer fill levels are included in a buffer status report.

3. The method according to claim 1, whereby the selecting said buffer status format is performed autonomously by said user equipment.

4. The method according to claim 1, whereby the selecting said buffer status format is configured via higher layer signaling.

5. The method according to claim 1, whereby the selecting said buffer status format is further performed by applying a certain criterion.

6. The method according to claim 5, whereby the criterion is the momentary buffer fill levels of individual radio bearers.

7. The method according to claim 5, whereby the criterion is a number of configured radio bearers.

8. The method according to claim 5, whereby the criterion is an applied service.

9. The method according to claim 1, whereby data is available on one radio bearer and wherein selecting said buffer status format comprises selecting the first format, and the first format includes an identification of said radio bearer and the buffer fill level.

10. The method according to claim 1, whereby data is available on several radio bearers and wherein selecting said buffer status format comprises selecting the second format, and the second format includes encoded information on the buffer fill levels for each radio bearer and the total buffer size.

11. The method according to claim 10, whereby the information on the buffer fill levels for each radio bearer is encoded as a fraction of the total buffer size.

12. An apparatus for communication in a wireless communication system, comprising:
a processing element configured to adaptively select, from among at least a first format and a second format, a buffer status format for indicating buffer fill levels of the apparatus based on a number of radio bearers or groups of radio bearers, k, for which data is available for transmission, wherein the first format indicates a buffer fill level associated with a single radio bearer or group of radio bearers and the second format indicates buffer fill levels associated with a plurality of different radio bearers or said groups of radio bearers;
an encoder configured to encode said buffer fill levels $B_k$ for each radio bearer or said group of radio bearers k into N bit fields, wherein each of the $2^N$ possible values for $B_k$ is mapped to a buffer fill level interval; and
a transmitter configured to wirelessly transmit a buffer status report that includes the encoded bit fields.

13. The apparatus according to claim 12, wherein the processing element is configured to select the first format when data is available on one radio bearer, and the first format includes an identification of said radio bearer and the buffer fill level.

14. The apparatus according to claim 12, wherein the processing element is configured to select the second format when data is available on multiple radio bearers, and the second format includes encoded information on the buffer fill levels for each radio bearer and a total buffer size.

* * * * *